United States Patent

[11] 3,583,213

[72] Inventors James R. Houck
610 Mitchell St., Ithaca, N.Y. 14850;
Henry V. Bohm, 13348 Talbot, Huntington Woods, Mich. 48070; Raymond Bowers, 109 Hansaw Road; William D. Wallace, 713 E. State St., both of Ithaca, N.Y. 14850
[21] Appl. No. 747,977
[22] Filed July 26, 1968
[45] Patented June 8, 1971

[54] NONDESTRUCTIVE TESTING OF CONDUCTIVE OBJECTS USING ULTRASONIC WAVES
11 Claims, 6 Drawing Figs.
[52] U.S. Cl. .................................................. 73/67.5
[51] Int. Cl. .................................................. G01n 29/04
[50] Field of Search ........................................ 73/67.7, 67.8, 67.5, 67; 116/137

[56] References Cited
OTHER REFERENCES
Article by A. Barone. & A. Giacomini, Experiments on Some Electrodynamic Ultrasonic Vibrators contained in Acustica Vol. 4 (1954)

Primary Examiner—James J. Gill
Attorney—Pennie, Edmonds, Morton, Taylor and Adams ABSTRACT: An ultrasonic wave is excited in the surface of the object by direct electromagnetic excitation in the presence of a DC magnetic field having a major component perpendicular to the electric vector of the electromagnetic field at the surface. A coil energized with RF may be employed. The ultrasonic waves propagate generally perpendicularly to the surface. A similar coil and DC magnetic field detect the ultrasonic wave arriving at the object surface after passing through the object, and produce an RF signal varying with flaws or other inhomogeneities in the object. Pulsed RF is advantageously employed, and in such case a single coil may be used for both generating the ultrasonic waves and responding to reflections thereof from flaws in the object.

PATENTED JUN 8 1971 3,583,213
FIG. 1     FIG. 1(a)
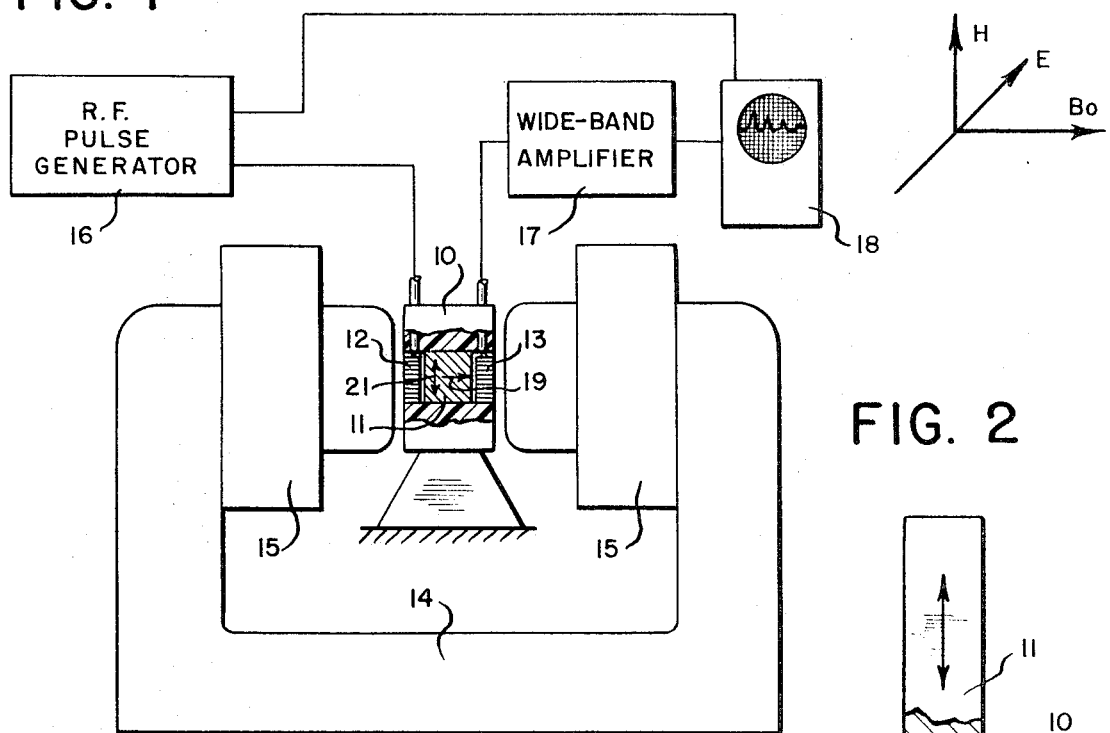
FIG. 2
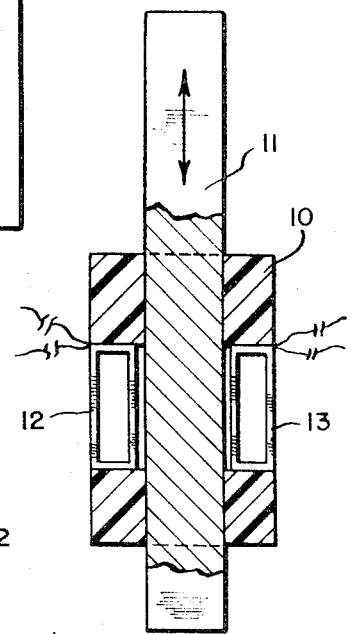
FIG. 4     FIG. 3
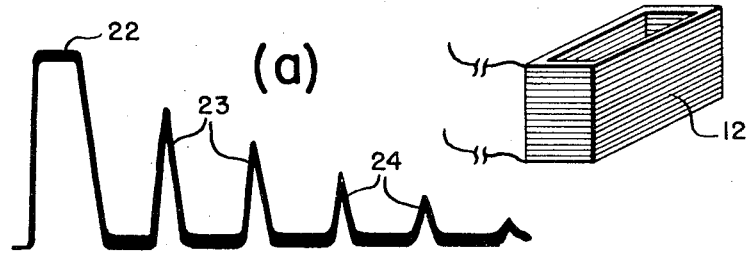
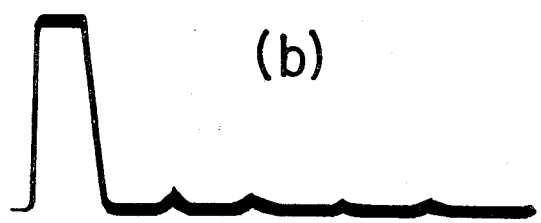
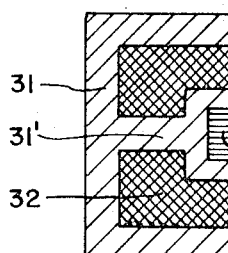
FIG. 5
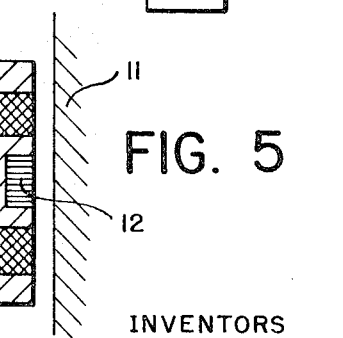
INVENTORS
JAMES R. HOUCK
HENRY V. BOHM
RAYMOND BOWERS
WILLIAM D. WALLACE
BY
Dennis Edwards Morton Taylor Adams
ATTORNEYS

NONDESTRUCTIVE TESTING OF CONDUCTIVE OBJECTS USING ULTRASONIC WAVES

BACKGROUND OF THE INVENTION

Ultrasonic testing of objects to determine the presence of flaws or other defects therein is known. Two procedures are commonly employed. In one a beam of ultrasonic energy is directed into the object and energy transmitted through it is indicated. In the other the energy reflected from areas within the object is indicated. The former uses two transducers, and the latter may use two transducers, or one if pulsed wave trains are employed.

In general, known methods require the cementing of a transducer to the object to be tested, or the coupling of a transducer to the object by an immersion liquid which conducts sound between transducer and object. Cementing is of limited usefulness in testing large objects or numerous small ones because of the time required to attach and remove the transducers, and is difficult to use on other than flat surfaces. Liquid immersion is inconvenient, and subject to limitations where the objects are hot or to be tested in vacuum, or where cleaning may be necessary to rid the object of the immersion liquid.

The present invention provides an ultrasonic testing apparatus for objects having conductive surfaces which does not require physical contact with the object nor fluid immersion.

The invention arises out of the discovery that ultrasonic waves may be produced in a conductive surface by direct electromagnetic excitation in the presence of a DC magnetic field. In copending application Ser. No. 748,023 filed July 26, 1968 by Houck, Bohm and Maxfield for "Ultrasonic Transducer," now U.S. Pat. No. 3,460,063, it is pointed out that this mechanism does not rely on piezoelectric or magnetostrictive effects, and is contrasted with the production of ultrasonic waves by helicon-phonon coupling which in general requires a pure metal, very low temperatures such as that of liquid helium (4.2° K.), a strong DC magnetic field, and helicon phase velocity approximately equal to the acoustic phase velocity.

Conditions commonly chosen for helicon-phonon coupling are such that the product $\omega_c \tau$ is large compared to unity. Here $\omega_c$ is the cyclotron frequency equal to $eB/(mc)$ where $e$ is the electron charge, $B$ the DC magnetic field, $m$ is the effective electron mass for motion of electrons in the medium, and $c$ the velocity of light. $\tau$ is the relaxation time of electrons, and may be expressed as equal to $\sigma m/ne^2$) where $\sigma$ is the electrical conductivity and $n$ the electron density.

The production and utilization of ultrasonic waves in accordance with the present invention is not limited to conditions required for helicon-phonon coupling, and in particular is useful over a wide range of temperatures, with other than pure metals, and with only moderate DC magnetic fields.

SUMMARY OF THE INVENTION

The present invention provides ultrasonic test apparatus for conductive objects, or objects having conductive surfaces, in which ultrasonic waves are produced in the object by an electromagnetic field at the conductive surface thereof in the presence of a DC magnetic field. The electromagnetic field may be produced by suitable RF means, such as by a coil placed adjacent the conductive surface and energized with an RF (radiofrequency) signal. The DC magnetic field may be produced by an electromagnet or a permanent magnet, and is oriented with a major component perpendicular to the electric vector of the electromagnetic field at the conductive surface. The ultrasonic waves propagate generally perpendicularly to the conductive surface and are subject to reflection, attenuation, etc. by flaws or other inhomogeneities in the object. Upon arriving at the surface of the object, the ultrasonic waves produce an RF signal in similar RF means in the presence of a DC magnetic field, and the RF signal is supplied to suitable indicating means. With pulsed RF, the same RF means and DC magnet may be used for both generation and detection of the ultrasonic waves.

Considering first the generation of the ultrasonic waves, the electromagnetic field and DC magnetic field at the conductive surface of the object produce ultrasonic waves at the frequency of the electromagnetic field which propagate in the object in a direction generally perpendicular to the conductive surface.

The production of the ultrasonic waves may be explained briefly as follows: The electromagnetic field, being an oscillating field, causes oscillations of the electrons in the conductive surface. Without the DC magnetic field, the electrons shield the positive ions and effectively no motion of the positive ions arises. However, in the presence of the DC magnetic field, the motion of the electrons is restricted by the Lorenz force acting thereon, so that they are unable to shield the ions. On an atomic scale, a sound wave in a metal is an oscillating motion of the positive metal ions. Since there is a coupling of the applied electromagnetic wave with the positive ions, an acoustic wave at the frequency of the applied wave is generated. In effect, RF currents in the surface of the metal couple directly to the lattice of the metal in the presence of the DC magnetic field, resulting in the production of the ultrasonic wave at the frequency of the RF currents.

The detailed explanation of the phenomenon is quite complicated, and has been dealt with in a paper by Houck et al., *Physical Review Letters*, Vol. 19, No. 5, 1967, pp. 224—226. Broadly it may be stated that, in the presence of a DC magnetic field, the electromagnetic fields of the applied wave couple directly with the electromagnetic fields of the acoustic wave.

The ultrasonic waves thus produced travel through the object to the opposite face thereof, being attenuated in an amount depending on the dimensions and material of the object, etc. If a flaw or other inhomogeneity is present in the path of the ultrasonic beam, some of the acoustic energy is reflected, thus weakening the beam arriving at the opposite surface. These and other effects are well known in the field of ultrasonic testing.

When the ultrasonic wave arrives at the conductive surface of the object, the converse of the generating operation takes place. That is, in the presence of the DC magnetic field, the ultrasonic wave will produce an RF signal in the coil or other RF means adjacent the surface. In such case the electromagnetic fields of the ions act as the driving field producing electronic RF currents.

It will be understood that although the above explanation of the theory underlying the phenomenon utilized in the invention is believed to be generally correct, it is subject to further refinement and elaboration. Regardless of the exact mechanism involved, we have found that ultrasonic waves may be generated and detected in the manner described, and used to detect flaws in an object.

The generation and detection of ultrasonic waves is not limited to very pure metals and very low temperatures, nor to very high DC magnetic fields. Rather, the testing is applicable to a wide variety of metals and other conductive materials, as well as nonconductive materials plated or otherwise coated with conductive material. Moderate DC magnetic fields in the range of 5 to 10 kilogauss have been employed with success, the response being proportional to the magnetic field strength, and tests indicate that weaker fields down to 1 kilogauss or below may be sufficient for some applications. Testing from cryogenic temperatures to room temperatures and above is feasible.

These factors are related by the product $\omega_c\tau$, since $\omega_c$ involves the DC magnetic field strength B, and $\tau$ involves metal purity (or impurity) as well as temperature. Tests indicate that flaw detection is feasible for values of $\omega_c\tau$ less than about unity, thus enabling its use under conditions commonly encountered in practice.

BRIEF DESCRIPTION OF THE DRAWINGS

FIG. 1 is an elevation showing ultrasonic testing apparatus in accordance with the invention, and FIG. 1(a) shows the field directions;

FIG. 2 is a plan view of the coil holder and test object of FIG. 1;

FIG. 3 shows a coil suitable for use in FIG. 1;

FIGS. 4(a) and 4(b) illustrate displays obtained under one test condition; and

FIG. 5 illustrates a modification using a single RF coil for testing.

DESCRIPTION OF THE SPECIFIC EMBODIMENTS

Referring to FIG. 1, a specimen holder 10 of nonmagnetic material has a passage therein through which an object 11 may be passed. The holder may be supported in any desired manner as indicated by the ground plane. Coils 12, 13 are mounted on each side of the passage, and a DC electromagnet having a core 14 and coils 15 produces a DC magnetic field at the surfaces of the object 11 adjacent coils 12, 13.

Coil 12 is here used to generate ultrasonic waves in object 11, and is energized from an RF generator 16, advantageously a pulsed generator although a continuous wave generator could be employed if desired. Coil 13 here serves as a detector coil and is connected to an amplifier 17 and suitable indicator here shown as an oscilloscope 18.

FIG. 1(a) shows the directions of the applied fields. B is the DC magnetic field, and H and E are the magnetic and electric vectors of the electromagnetic field at the surface of object 11 adjacent coil 12. As will be observed, B is perpendicular to E. The applied fields produce ultrasonic waves at the frequency of the RF generator which initially propagate in object 11 generally perpendicularly to the surface adjacent coil 12, as indicated by arrow 19. The direction of particle motion is indicated by double-headed arrow 21 and corresponds to shear-type ultrasonic waves.

Assuming a homogeneous body 11, the ultrasonic waves pass through the body to the surface adjacent coil 13 and there produce an RF signal in coil 13 which is indicated on oscilloscope 18. Coil 13 is here shown with its axis aligned with that of coil 12, so that maximum response will be obtained for shear waves polarized as indicated by arrow 21. Any flaws in object 11 which alter the intensity of the ultrasonic beam at the surface adjacent coil 13, or which alter the polarization, will be indicated by a change in amplitude of the received signal.

Coils 12 and 13 may be constructed as desired. Flat coils as illustrated in FIG. 3 have been employed with success.

In one particular test, coils having face dimensions ⅛ inch × ⅛ inch and a thickness of one-sixteenth inch were used to test aluminum bars ½ inch × ½ inch in cross section. The magnetic field was about 15 kilogauss and the test was conducted at room temperature. The coils had 10 turns and RF generator 16 supplied 10 megahertz pulses of about 1 microsecond duration with a peak power of about 100 watts. The impedance match between generator and coil 12 was not believed optimum. Nevertheless, with a fairly homogeneous bar, received signals as illustrated in FIG. 4(a) were obtained. The initial pulse 22 is due to leakage between two coils. Subsequent pulses 23, 24 indicate successive reflections of the ultrasonic waves at the surfaces of the bar. Aluminum bars milled from machine shop plate stock were observed to be acoustically anisotropic in directions transverse to their axes. One direction gave a strong echo pattern, but when the bar was rotated 90° the echo pattern was reduced. Soft aluminum was found to give larger signals than hard aluminum.

When a bar containing an artificial flaw in the form of a 1 mm. hole drilled across the bar was moved through the holder, different signals were obtained depending on the orientation of the hole. With the axis of the hole transverse to the propagation and shear directions, the signal was markedly reduced when the hole became centered between the coils, a 14 db. reduction being noted in one test. This is indicated in FIG. 4(b). The location could be determined within 1 mm. With the hole parallel to the propagation direction but perpendicular to the shear direction, a noticeable but lesser reduction of about 3 db. was observed. Thus the signal changed with both position and orientation of the flaw.

With an aluminum cylinder in the same test setup, presenting a curved surface to the coils, similar results were obtained.

Direct ultrasonic generation as here used has been observed in a wide variety of metals such as copper, gallium, gold, indium, iron, lead, silver, steel, tin, titanium, and niobium, in the semimetal bismuth, and in the semiconductors lead telluride and indium antimonide. Thus the test apparatus of the invention is believed widely applicable to conductive materials.

FIG. 5 shows a modification of FIG. 1 which uses only a single coil for generating and detecting ultrasonic waves. The magnetic field is produced by an electromagnet having a core 31 with center pole 31′, and a coil 32. RF coil 12 is mounted in a recess of center pole 31′. By applying RF pulses to coil 12, ultrasonic waves are produced in object 11 as in FIG. 1. Echoes from flaws or the opposite object surface will be picked up by coil 12 and the resultant RF signals supplied to amplifier, detector and indicator apparatus.

If desired, two of the coil-magnet structures of FIG. 5 could be used in the arrangement shown in FIG. 1, one to provide the coil and DC magnetic field for generating ultrasonic waves and the other to provide the coil and DC magnetic field for detecting the waves. Thus two separate electromagnets are used instead of one. With a single electromagnet as in FIG. 1, an increase in the magnetic field B will result in an increase in the detected signal proportional to $B^2$, since the response is proportional to magnetic field strength both in generation and detection. With separate electromagnets, the field strengths may be separately selected and the overall response will be proportional to the product of the individual field strengths.

The frequency of the RF and ultrasonic waves may be selected as desired, tests indicating that operation from a few megahertz to a few hundred megahertz is feasible, and lower and higher frequency operation is believed possible. Inasmuch as the RF currents used to generate and detect ultrasonic waves are confined to a conductive thin surface layer, objects of nonconductive material plated or otherwise provided with conductive surfaces may be tested.

The specific embodiments shown utilize a DC magnetic field generally perpendicular to the object surface, with resultant shear type ultrasonic waves. Longitudinal (compression) waves may also be produced by orienting the DC magnetic field with a major component along the conductive surface of the object adjacent the RF coil or coils, and perpendicular to the electric vector of the electromagnetic wave at the surface, as described in the aforesaid application Ser. No. 748,023.

A DC magnetic field which is perpendicular to the electric vector at the conductive surface may be expected to produce optimum amounts of ultrasonic power. However, it will be understood that departures from this relationship may be made if desired. On nonflat surfaces departures will ordinarily be present. However, as exemplified by the tests on cylindrical rods, satisfactory results may still be obtained.

Alignment of both coils, as in FIG. 1, may be expected to produce maximum signals if the initial polarization is undisturbed in the passage of the ultrasonic waves through the object. Disalignment may be useful for some applications. It will be understood that the alignment of the detector coil 13 with respect to the DC magnetic field so that the electric vector is perpendicular thereto may be specified on the assumption that an RF signal is applied to the coil, event though it is not applied during use.

It will be understood that the apparatus of the invention may be modified in accordance with known principles in the field of ultrasonic testing to meet the requirements of various applications, and that various techniques known in this field may be utilized as desired.

We claim:
1. Ultrasonic testing apparatus for objects having conductive surfaces which comprises
   a. generating means for producing ultrasonic waves at a first conductive surface of a said object and detecting means for receiving ultrasonic waves transmitted through at least a portion of said object to a second conductive surface thereof,
   b. said generating and detecting means each including RF means electromagnetically coupled with respective first and second conductive surfaces,
   c. said generating RF means being adapted, when energized with an RF signal, to produce at said first conductive surface of the object an electromagnetic field having an electric vector direction,
   d. said detecting RF means being adapted, if it were energized with an RF signal, to produce at said second conductive surface of the object an electromagnetic field having an electric vector direction,
   e. means for producing at each of said conductive surfaces a DC magnetic field having a major component perpendicular to the respective electric vector direction,
   f. said generating means including means for applying an RF signal to the RF means thereof to produce ultrasonic waves initially propagating generally perpendicularly to the respective conductive surface of an object,
   g. said detecting means being responsive to the reception of ultrasonic waves at said second conductive surface to produce an RF signal representative thereof,
   h. said detecting means including means for producing an indication of the RF signal produced thereby.

2. Apparatus according to claim 12 in which said generating RF means and detecting RF means are spaced apart for the passage of a said object therebetween.

3. Apparatus according to claim 12 in which said major component of the DC magnetic field is generally perpendicular to an object to be tested.

4. Apparatus according to claim 2 in which said generating RF means and detecting RF means are respective coils positioned with their axes in substantial alignment and approximately perpendicular to a line through the coils.

5. Apparatus according to claim 4 in which the sides of said coils facing a said object are substantially flat.

6. Apparatus according to claim 5 in which said major component of the DC magnetic field is perpendicular to said coil sides.

7. Ultrasonic testing apparatus for objects having conductive surfaces which comprises
   a. generating and detecting means for producing ultrasonic waves at a conductive surface of a said object and detecting reflections thereof,
   b. said generating and detecting means including RF means electromagnetically coupled with said conductive surface,
   c. said RF means being adapted, when energized with an RF signal, to produce a first electromagnetic field at said conductive surface and, when energized with a like electromagnetic field at said surface, to produce a corresponding RF signal,
   d. and means for producing at said conductive surface a DC magnetic field having a major component perpendicular to the electric vector of said first electromagnet field,
   e. said generating and detecting means including means for applying a pulsed RF signal to said RF means to produce ultrasonic waves initially propagating generally perpendicularly to said conductive surface of an object and means for detecting representative RF signals from said RF means in response to said ultrasonic reflections and producing an indication thereof.

8. Apparatus according to claim 7 in which said major component of the DC magnetic field is generally perpendicular to an object to be tested.

9. Apparatus according to claim 7 in which said RF means is a coil with the axis thereof extending laterally of the surface of an object to be tested.

10. Apparatus according to claim 9 in which the side of said coil facing an object to be tested is substantially flat.

11. Apparatus according to claim 10 in which said major component of the DC magnetic field is perpendicular to said coil side.

PO-1050
(5/69)

UNITED STATES PATENT OFFICE
CERTIFICATE OF CORRECTION

Patent No. __3,583,213__   Dated __June 8, 1971__

Inventor(s) __JAMES R. HOUCK, HENRY V. BOHM, RAYMOND BOWERS and WILLIAM D. WALLACE__

It is certified that error appears in the above-identified patent and that said Letters Patent are hereby corrected as shown below:

Col. 1, line 48, "$\sigma m/ n e^2)$" should be -- $\sigma m/(ne^2)$ -- .

Col. 3, line 63, the defective printing should read -- between the two -- .

Col. 4, line 43, "conductive" should be -- very -- .

Col. 4, line 69, "event" should read -- even -- .

Signed and sealed this 23rd day of November 1971.

(SEAL)
Attest:

EDWARD M. FLETCHER, JR.          ROBERT GOTTSCHALK
Attesting Officer                Acting Commissioner of Patents